United States Patent
Sim

(10) Patent No.: US 6,565,639 B2
(45) Date of Patent: May 20, 2003

(54) FUNCTIONAL GLUE MIXED WITH CRUSHED ON GINKO (LEAVES) AND PAULOWNIA (LEAVES) MATERIALS AND FABRICATING METHOD THEREOF

(76) Inventor: Man-Gu Sim, 222-4, Gyerim 2-dong, Dong-gu, Kwangju-city (KR)

( * ) Notice: Subject to any disclaimer, the term of this patent is extended or adjusted under 35 U.S.C. 154(b) by 0 days.

(21) Appl. No.: 10/127,611

(22) Filed: Apr. 23, 2002

(65) Prior Publication Data

US 2002/0185039 A1 Dec. 12, 2002

(30) Foreign Application Priority Data

Jun. 7, 2001 (KR) ......................................... 2001-31810

(51) Int. Cl.[7] ........................... C09J 189/00; C09B 5/14
(52) U.S. Cl. .................................. 106/126.2; 106/18.32
(58) Field of Search ........................... 106/18.32, 126.2

(56) References Cited

U.S. PATENT DOCUMENTS 4,898,727 A * 2/1990 Osada et al. ............... 424/76.1
5,240,699 A * 8/1993 Osada et al. ............... 424/76.9

* cited by examiner

Primary Examiner—David Brunsman
(74) Attorney, Agent, or Firm—Burns Doane Swecker & Mathis, LLP

(57) ABSTRACT

There are disclosed a functional glue in which the crushed ginkgo (leaves) and paulownia (leaves) materials are mixed with rice glue or barley and wheat glue at a desired ratio, thereby providing a mothproofing function, an antibacterial function and a moisture proofing function, and a fabricating method thereof. The method of fabricating a functional glue mixed with crushed ginkgo (leaves) and paulownia (leaves) materials, comprises steps of: filling the crushed ginkgo (leaves) and paulownia (leaves) materials in a crusher, respectively or all together so as to crush the crushed ginkgo (leaves) and paulownia (leaves) materials; and putting each of the crushed materials or all of them in a stirrer along with rice glue, or barley glue and wheat glue so as to fairly stir the crushed material and the glue.

2 Claims, No Drawings

FUNCTIONAL GLUE MIXED WITH CRUSHED ON GINKO (LEAVES) AND PAULOWNIA (LEAVES) MATERIALS AND FABRICATING METHOD THEREOF

BACKGROUND OF THE INVENTION

1. Field of the Invention

The present invention relates to a functional glue mixed with crushed ginkgo (leaves) and paulownia (leaves) materials and a fabricating method thereof, and more particularly, to a functional glue in which the crushed ginkgo (leaves) and paulownia (leaves) materials are mixed with rice glue or barley and wheat glue at a desired ratio, thereby providing a mothproofing function, an antibacterial function and a moisture proofing function, and a fabricating method thereof.

2. Description of the Related Art

Generally, glue used in papering is fabricated by mixing wheat flour and water and then boiling the mixture. In this case, if the glue is exposed to moisture, an adhered object may be easily separated from an adhered place. What is worse, a surface of an indoor wall may be rotten. Therefore, there are some problems that the indoor beauty is injured and also various insects live therein. Further, a chemical adhesive contained in the glue causes the contamination of nature. Furthermore, there is another problem that indoor air is contaminated by the conventional board thereby injuring person's health.

SUMMARY OF THE INVENTION

Therefore, it is an object of the present invention to provide a functional glue having a mothproofing and antibacterial function, which previously prevents generation of mold, insect, and moth and maintain indoor air to be clean, and also protects a wooden structure from the insects and the moth, thereby extending durability of a building and previously preventing damage of the building.

It is an object of the present invention to provide a method of fabricating the functional glue, in which the glue is fabricated by mixing crushed ginkgo (leaves) and paulownia (leaves) materials with rice glue having a warmth emitting function, if the glue is used for a construction material, a material for furniture, a board, and a papering operation which require a thermal insulation function, but the glue is fabricating by mixing the crushed ginkgo (leaves) and paulownia (leaves) materials with barley or wheat glue having an air cooling function, if the glue is used for a construction material, a material for furniture, a board, and a papering operation which require an air cooling function.

To achieve one of the aforementioned objects of the present invention, there is provided a method of fabricating a functional glue mixed with crushed ginkgo (leaves) and paulownia (leaves) materials, comprising steps of filling the crushed ginkgo (leaves) and paulownia (leaves) materials in a crusher, respectively or all together so as to crush the crushed ginkgo (leaves) and paulownia (leaves) materials; and putting each of the crushed materials or all of them in a stirrer along with rice glue, or barley glue and wheat glue so as to fairly stir the crushed material and the glue.

DETAILED DESCRIPTION OF THE PREFERRED EMBODIMENTS

Now, preferred embodiment of the present invention will be described in detail according to its processes.

[A First Process] (A Process of Crushing Ginkgo (Leaves) and Paulownia (Leaves))

Ginkgo (leaves) and paulownia (leaves) are crushed independently or all together in 50~200 mesh (it is not limited to this size).

[A Second Process] (A Process of Fabricating Glue)

Each of rice flour, wheat flour and barley flour of 100~300 mesh (it is not limited to this size) is mixed with water and then boiled to form rice glue, wheat glue and barley glue.

At this time, a ratio of the main material and the water is 20~50:80~50.

[A Third Process] (A Process of Mixing the Glue and the Crushed Materials)

The crushed and mixed ginkgo (leaves) and paulownia (leaves) materials or each crushed material formed in the first process is mixed with the rice glue, barley glue and wheat glue at a desired ratio in a stirrer, and then the mixture is stirred fairly.

Herein, in case the crushed ginkgo (leaves) and paulownia (leaves) materials are mixed each other, they are mixed at a ratio of 50:50. The crushed materials are mixed with the rice glue, or the barley and wheat glue at a ratio of 40~20:60~80 weight percent. The mixing ratio is adjusted according to the material or its application.

Further, a mixing ratio between the crushed ginkgo (leaves) material and the rice glue or the barley and wheat glue, and a mixing ratio between the crushed paulownia (leaves) material and the rice glue or the barley and wheat glue are the same as the above ratio. They are also adjusted according to the material or its application.

[A Fourth Process] (A Process of Completing a Product)

The functional glue fabricated in the third process is filled at a fixed amount in each vinyl bag. Then, the vinyl bag is tightly sealed and packed. Therefore, a glue product is completed.

If wallpaper is attached to a surface of a wall of a wooden building or a building using a glue as described above, a functional glue mixed with the crushed ginkgo (leaves) material functions to previously prevent generation of mold or moth and also protect a wooden structure from insects, thereby extending durability of a building and previously preventing damage of the building. A functional glue mixed with the crushed paulownia (leaves) material functions to absorb moisture, thereby controlling humidity.

Further, a functional glue mixed with the rice glue has a warmth emitting function, and a functional glue mixed with the barley glue and the wheat glue has an air cooling function.

According to the present invention, as described above, a functional glue is facilely fabricated. If the glue is applied to a wooden building, it previously prevents generation of mold or moth and also protects a wooden structure from insects, thereby extending durability of a building and previously preventing damage of the building. Further, since the board of the present invention is made of natural substances, it is facilely resolved in the soil and also served as compost when being scrapped. Furthermore, the board maintains indoor air to be clean.

While the present invention has been described in detail, it should be understood that various changes, substitutions and alterations could be made hereto without departing from the spirit and scope of the invention as defined by the appended claims.

What is claimed is:

1. A method of fabricating a functional glue mixed with crushed ginkgo leaves and paulownia leaves materials, comprising steps of:

filling the crushed ginkgo leaves and paulownia leaves materials respectively or all together in a crusher, so as to crush the crushed ginkgo leaves and paulownia leaves materials; and putting each of the crushed materials or all of them in a stirrer along with rice glue, or barley glue and wheat glue so as to fairly stir the crushed material and the glue.

2. A functional glue fabricated by the method of claim 1.

* * * * *